United States Patent [19]

Wills et al.

[11] 4,365,591
[45] Dec. 28, 1982

[54] LIVESTOCK HANDLING SYSTEM AND APPARATUS THEREFOR

[75] Inventors: David R. Wills, Roydon, nr Diss; Ralph E. Green, Hove; Barry W. Landymore, Brockdish, nr Diss, all of England

[73] Assignee: Anglia Autoflow Limited, England

[21] Appl. No.: 312,862

[22] Filed: Oct. 19, 1981

[30] Foreign Application Priority Data

Apr. 1, 1981 [GB] United Kingdom ............... 8110236

[51] Int. Cl.³ ............................................. A01K 31/07
[52] U.S. Cl. .................................................. 119/82
[58] Field of Search ................. 119/82, 12, 17, 21, 119/22; 17/24

[56] References Cited

U.S. PATENT DOCUMENTS 4,273,071 6/1981 Clark et al. ........................ 119/17

FOREIGN PATENT DOCUMENTS 2429127 2/1980 France ................................ 119/12

*Primary Examiner*—Hugh R. Chamblee
*Attorney, Agent, or Firm*—Nelson E. Kimmelman

[57] ABSTRACT

Apparatus for handling small livestock such as chickens comprising open topped slideable drawers (12) in a rectangular housing (10) from which they are slid to allow for loading and subsequently for unloading onto a transfer conveyor (20). A roof (34) over the conveyor covers the open tops of the drawers as they move therealong to prevent the livestock from escape.

An elevating platform (28) adjacent the conveyor (20) allows the housing (10) to be raised and lowered to allow the drawers to be pushed or pulled from the housing directly onto the conveyor.

A method of collecting and handling livestock involves the step of filling the drawers in the housing with livestock, transporting the housing to a drawer unloading station where the drawers are removed from the housing onto a conveyor, for movement therealong beneath a roof which serves to cover the open tops of the drawers to prevent the livestock escaping, while they are transferred to a livestock unloading station at which the roof terminates.

A conveyor for transferring open topped drawers containing livestock includes a roof below which the drawers are moved to prevent the livestock from escaping.

15 Claims, 3 Drawing Figures

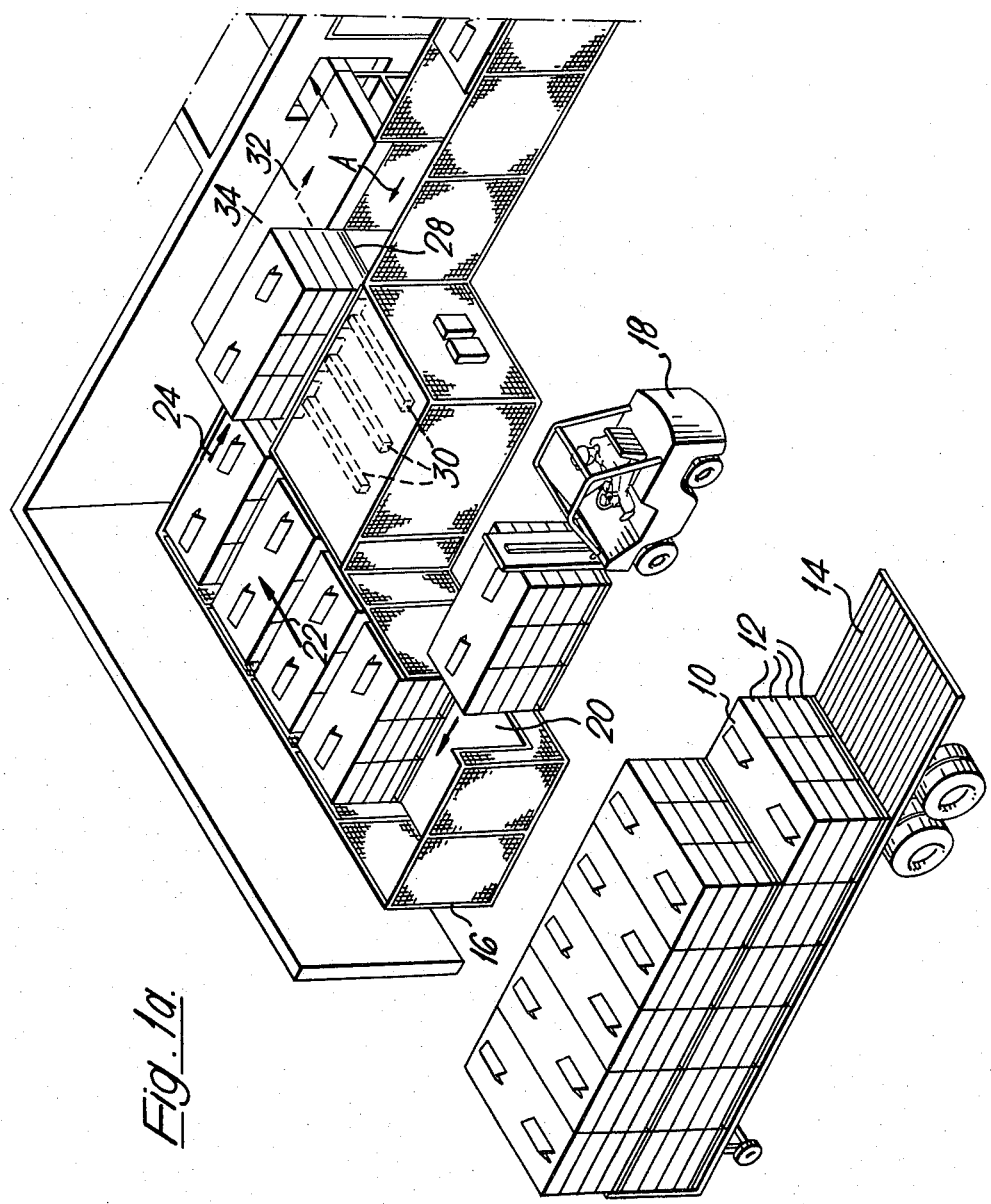

LIVESTOCK HANDLING SYSTEM AND APPARATUS THEREFOR

FIELD OF INVENTION

This invention concerns improvements relating to a system for conveying small livestock particularly chickens from geographically spaced locations where the small livestock is housed to a factory in which the livestock is to be killed and processed. As indicated the invention is of particular application in the handling of poultry such as chickens, turkeys and the like but it is to be appreciated that the invention may be used in the handling of other small livestock.

BACKGROUND OF THE INVENTION

A system and apparatus for conveying and handling small livestock is described inter alia in U.S. Pat. No. 3,797,460 and British Patent Specification Nos. 2050309 and 2049401.

In all of these systems containers are provided for transporting small livestock from the remote locations such as farms to a central processing plant. Each container is itself divided into a number of sections either by partitions or drawers or both and at the processing station the small livestock are removed from the compartments within the containers and placed on an overhead conveyor for electrocution or the like ready to be plucked and prepared either as oven-ready poultry or ready for freezing. The containers are washed and sterilised and made ready for collection and reuse.

The systems described in the U.S. and British patent specifications all demonstrate a principle known from other spheres of life, namely that it is more economical for a single transporter to carry a large number of individual loads on a single circular route than for each individual supplier to deliver livestock or other units of produce independently and separately.

The handling system relies on a distribution by lorry of containers to outlaying farms to enable the farm-hands to load into the containers livestock ready to be slaughtered and processed. The same or a different lorry can then collect the filled containers and move them to the processing plant where as described above they can be unloaded and reprocessed for a repeat journey.

In the system described in the American patent specification, the containers include individual compartments which are closed off by means of gates. Access to the compartments is through the open ends exposed when the gates are swung open and livestock can only be loaded into the compartments through these open ends and can only be unloaded therefrom by reverse process and a degree of mechanisation to assist in the unloading of livestock is illustrated.

In the case of the system and apparatus described in the two British patent specifications referred to, drawers and compartments are illustrated which although can be withdrawn for the purpose of loading and unloading the livestock, are not normally separated from the containers.

In both systems the transfer of the poultry to the operatives at the slaughter house is direct from the container and as a consequence the layer to the receiving section of the processing plant and the handling of the birds at the reception section within the plant is not as convenient as it might be. In particular, in the system described in the two British specifications, only one operative can unload from one side of each container at a time although there are possibly up to eight compartments to be unloaded and this inevitably slows down the handling capability of the system.

In the United States system the livestock are all dumped onto a conveyor and this can sometimes result in the birds either becoming damaged or damaging one another in their excitement and panic and it is not unknown for birds to attempt to fly up as a result of the sudden discharge of the container onto the conveyor.

OBJECT OF THE PRESENT INVENTION

With these points in mind it is an object of the present invention to provide an improved compartmented container which allows a greater degree of flexibility and a higher unloading rate to be obtained particularly at a well organised receiving station of a processing plant.

It is also an object of the present invention to provide an improved apparatus for unloading the individual compartments from the conveyor.

It is another object of the present invention to provide improved apparatus for transferring the unloaded livestock to the beginning of the processing line.

It is a further object of the present invention to provide an improved system for handling livestock within the processing plant.

It is a further object of the present invention to provide the improved handling and sterilisation process for the compartments which contain livestock.

SUMMARY OF THE INVENTION

According to one aspect of the present invention an improved container for small livestock comprises a housing having separate compartments in the form of slidable drawers which can be slid at least from one side thereof completely from the housing, the framework of the housing providing guides on which the drawers slide, each of the individual drawers being closed off (when in its pushed in position) from the drawer above by at least the floor of the latter or by the top panel of the housing.

In one arrangement, the housing is merely a framework and side struts provide guides or rails on which the drawers can slide and only the floor of the drawer above separates a compartment from that above it.

In another arrangement the housing includes internal floors and lateral guides to receive the drawers so that each drawer is fully covered when its fully pushed in position at all times even when the drawer above has been withdrawn.

Preferably each of the drawers is open topped to allow ready and immediate access when it has been exposed.

According to a preferred feature of the invention, loading of the drawers is achieved by simply pulling the drawer out either partially or fully and loading into it a pre-determined number of livestock and thereafter closing the drawer into the housing.

According to another preferred feature of the invention unloading of the drawers is achieved by separately pushing each drawer in turn out of the housing and onto a conveyor adapted to receive each drawer and convey same from the unloading position to a processing position.

According to a particularly preferred feature of the invention, the transfer conveyor includes a roof for closing off the open top sides of the drawers as they are transferred therealong. In this way there is no tendency for livestock to fly or jump out of the drawers and the roof can be continuous except in those regions along the length of the conveyor at which operatives are to stand to remove livestock from the drawers.

Where the roof terminates to expose the drawers therebelow, the final edge of the roof may be transverse to the direction of movement of the conveyor or may be inclined thereto so as to expose only the total width of the compartment after the latter has moved by its own length from the position at which it first starts to become exposed to the position where it fully leaves the roof.

Preferably the unloading of the drawer compartments from the container is effected by:

1. Mounting the container housing on an elevating platform,
2. Adjusting the height of the platform so that the underside of one of the drawers is in line with the transfer conveyor,
3. Pushing the drawer from the rear onto the transfer conveyor to cause the latter to move the drawer towards the processing plant,
4. Withdrawing the means which effected the removal of the first mentioned drawer,
5. Adjusting the height of the container so as to align another drawer with the take-off conveyor and,
6. Repeating the removal process until all the drawers in the container have been removed and pushed onto the transfer conveyor, one after the other.

In complete contrast to the systems previously described, the individual drawers are separately removable from the container housing and in the normal course of events are so removed to allow for at least the unloading of livestock therefrom and typically to allow for loading as well. The livestock are thus fully protected within a suitable enclosure which is maintained in a closed condition until the actual unloading location which an operative can remove the livestock one by one and attach them to the overhead conveyor for movement to the final processing stages.

The invention thus represents a significant advantage over the previously described systems in that little or no loss or damage of livestock can occur between its delivery into the compartmentalised container and its removal therefrom for slaughter etc.

According to another aspect of the present invention, apparatus for unloading the drawers from a container according to the invention, comprises, 1. An elevating platform on which a container housing can be located,
2. A means for adjusting the height of the platform and maintaining same at a number of selected heights at which one of the drawers therein aligns with a transverse conveyor,
3. Thrust means for exerting a push on a rear wall of the drawer which is aligned with the transfer conveyor,
4. Means for effecting displacement of the thrust means towards the transfer conveyor so as to push the drawer engaged thereby onto the transfer conveyor, and
5. Means for retracting the thrust means and altering the elevation of the elevating platform to align another drawer with the transfer conveyor.

Where drawers located side by side in the housing in addition to being stacked one above the other, further efficiency can be obtained by providing additional thrust means operated independently or by the same drive means for operating the first mentioned thrust means to eject two or more drawers simultaneously side by side onto the transfer conveyor.

The means for effecting movement of the thrust means may comprise a hydraulic or pneumatic ram, an electromagnetic ram, electromagnetic drive means, motor means, or mechanical means. In the alternative the thrust means may be manually operable either directly by means of levers or the like.

According to a further preferred feature of the invention, after being unloaded, the individual drawers are conveyed to and through a washing and sterilising apparatus. A dryer may be provided at the end of the washing and sterilising apparatus if required.

According to another aspect of the invention, the emptied container housing may be themselves sprayed or washed or otherwise cleaned ready to receive the cleaned drawers.

According to a further aspect of the invention in an improved system the cleaned drawers are inserted once again into the empty container housings and the latter are stacked ready for collection and redelivery.

In a preferred embodiment of the invention, the washing and sterilising of the individual drawers is preferably achieved by high pressure washing using recirculated water with inbuilt screen filtering and on the final end of which apparatus is fitted a sanitising unit for disinfectant of the washed drawers.

Preferably the container housings are adapted to be lifted by a forklift truck of the like to allow for simple and convenient handling of the container housings on the one hand between farm buildings and the lorry or despatch location on the farm, between the lorry and a loading bay for serving the apparatus which removes the drawers from each container housing and after the drawers and containers have been recombined, from the final bay back onto a waiting lorry.

Preferably the transport comprises a low loader or other articulated wagon.

Preferably the drawers or trays are formed from a plastics material. The container housing may be formed from plastics or woods or metal or some combination thereof.

The invention will now be described by way of example and with reference to the accompanying drawings.

LIST OF DRAWINGS

FIG. 1a and FIG. 1b show a perspective view of a livestock handling facility at a slaughter house constructed and arranged to operate in accordance with the present invention, and FIG. 2 is an end view of the de-stacking apparatus forming part of the livestock handling facility shown in FIG. 1.

DETAILED DESCRIPTION OF DRAWINGS

Figure 1B:
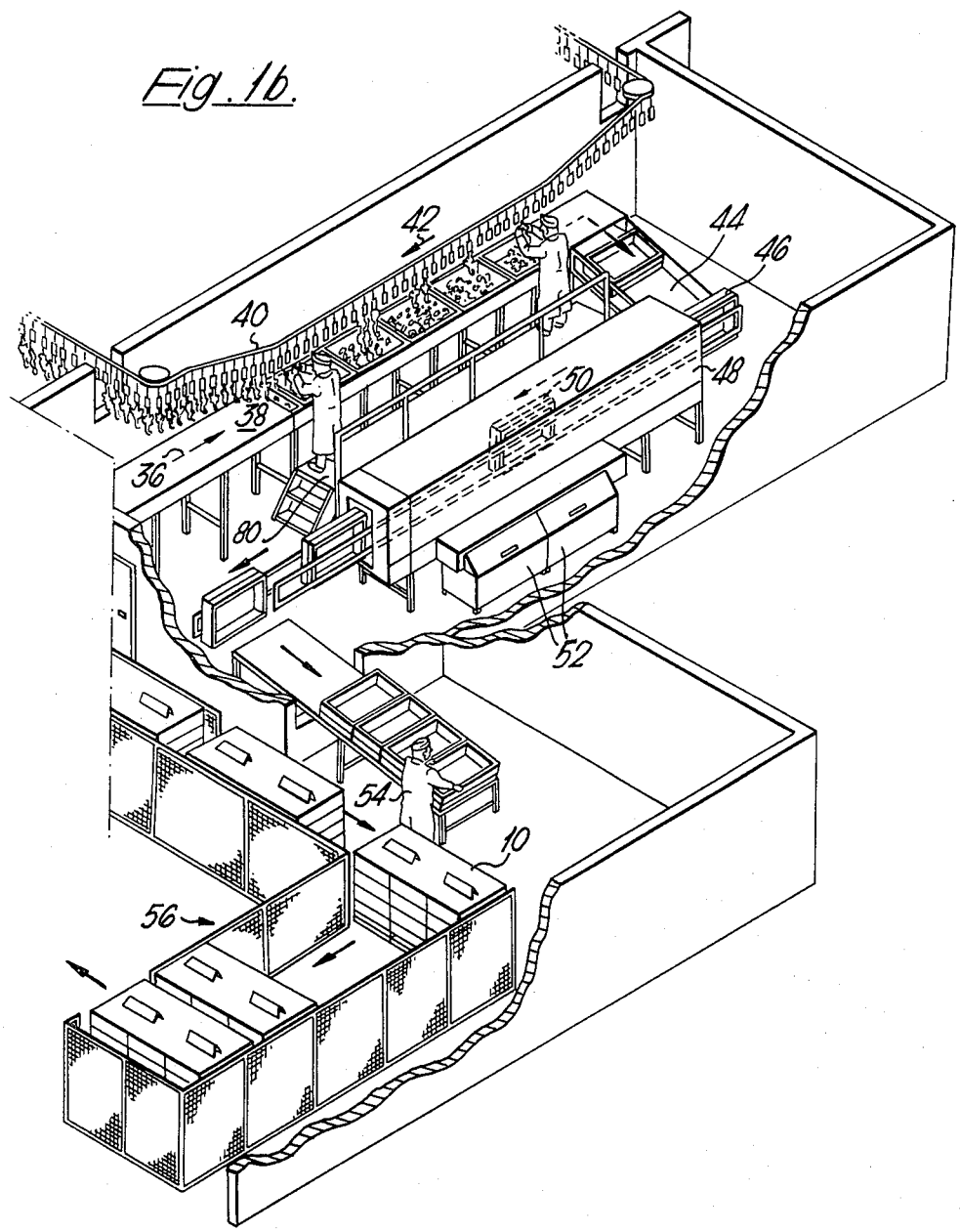

As shown in FIG. 1, rectangular containers 10 containing twelve removable drawers one of which is designated by reference numeral 12 are adapted to be stacked at least two high along the length of a trailer unit 14 typically part of an articulated lorry. The latter is adapted to be driven around a circular route at points around which one or more containers such as 10 are left to be filled wholly or partially with livestock by a farmer. On a second trip, the lorry picks up the now filled containers 10 and transports them to the processing plant part of which is shown in the remainder of FIG. 1.

At the processing plant the trailer section 14 of the lorry is left adjacent a loading bay 16 and a forklift truck or the like 18 transfers each container one by one into the loading bay and onto an initial conveyor 20. This conveyor moves the containers in the direction of the arrow 22 onto a second conveyor (not shown) which operates transversely to the direction of movement of the first conveyor 20 so as to move the containers in the direction of the arrow 24.

Figure 2:
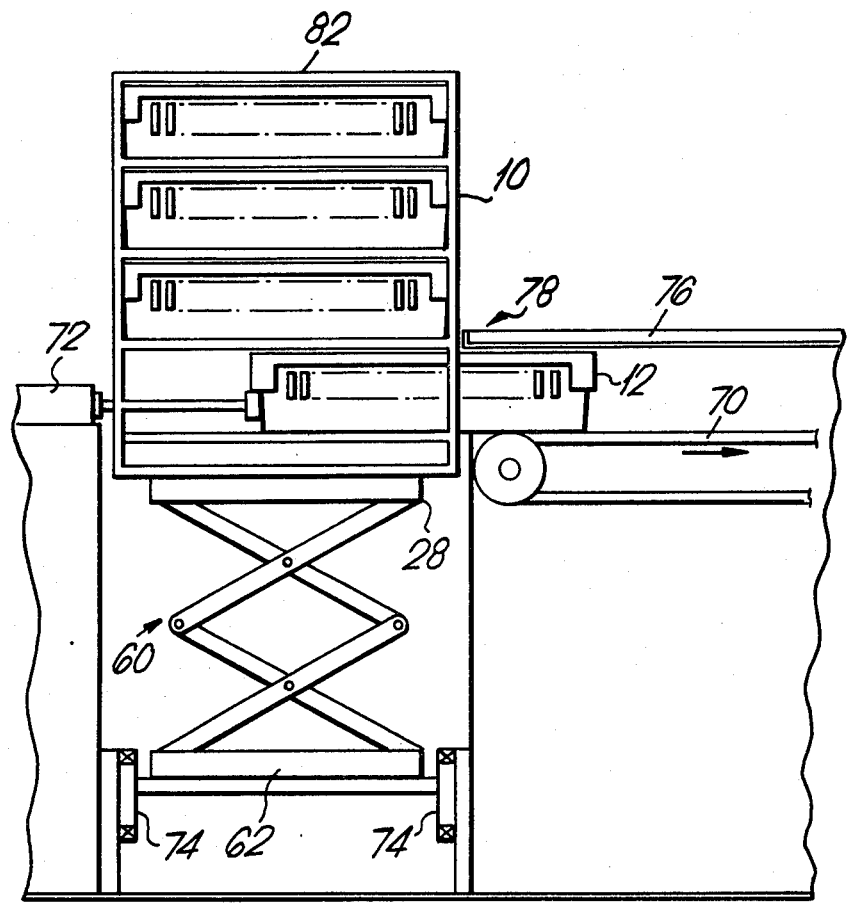

A de-stacking station is provided in the region of arrow 26 details of which are shown in FIG. 2. In essence the de-stacking station includes a raisable platform 28 by which a container can be elevated to the position shown in FIG. 1 and the lower drawers or trays 12 aligned with three thrust devices 30. Operation of the latter pushes the three lower most trays or drawers 12 onto a third conveyor which moves the de-stacked trays in the direction of the arrow 32 underneath a roof 34. The third conveyor (not shown) serves to transfer the trays onto a fourth conveyor again hidden from view, which moves the trays in the direction of the arrow 36 again under cover of a roof section designated by reference numeral 38.

The latter terminates at the beginning of an unloading region where operatives stand to lift the livestock out of the exposed trays and hang them on an overhead conveyor generally designated 40. The livestock are then transferred via the overhead conveyor to a slaughtering area and subsequent processing.

In the drawing the overhead conveyor moves in the direction of the arrow 42.

Although only two operatives are shown, up to five positions are provided for in the installation shown in FIG. 1.

The emptied trays pass down a conveyor shute 44 and at the bottom are tipped through a right angle to occupy the position shown by the tray 46, which is now carried by a further conveyor means (not shown) through a washing and sterilising apparatus generally designated 48.

One such tray is shown in dotted outline at 50 as it passes through the washing line.

Controls for the washing and sterilised apparatus are housed in a control module 52.

After leaving the washing and sterilising apparatus 48, the trays are tipped once again through a right-angle so as to occupy a uniform position in which the open face is upper most and a further operative 54 serves to unload the now cleaned trays and insert them into container housings 10 which are waiting to be filled and which have been moved by continued action of the second conveyor to a final bay generally designated 56 ready for collection by the forklift truck to be loaded onto a waiting trailer.

FIG. 2 of the drawings illustrates the detailed construction of the de-stacking stage shown in FIG. 1 and previously referred to in the description thereof. The view at FIG. 2 is taken in the direction of the arrow 'A' in FIG. 1 and shows a container 12 in an elevated position on a platform 28 which itself is supported on a scissors mechanism 60 itself attached to drive mechanism 62 by which the scissors mechanism can be extended in an upward direction or retracted in a downward direction so as to raise or lower the platform 28.

The maximum deflection of the scissors mechanism in an upward direction causes the lower most line of trays 12 to be aligned with a transfer conveyor denoted in FIG. 2 by reference numeral 70.

The latter moves in the direction of the arrow shown.

The lower most trays 12 are pushed to the right as shown in FIG. 2 by means of rams 72 located on the opposite side of the stacking device from the conveyor 70.

After the lower most tray or trays 12 have been discharged onto the conveyor 70, the ram means 72 is retracted and the scissors mechanism 60 is lowered into a first intermediate position. Here the second layer of trays are aligned with the transfer conveyor 70 and with extension of subsequent retraction of the rams 72, the penultimate layer of trays will be discharged onto the transfer conveyor 70.

A subsequent lowering of the platform 28 to a second intermediate position allows the next remaining layer of trays to be discharged onto the conveyor 70 and a third and final lowering of the platform 28 aligns the topmost line of trays to be aligned with the transfer conveyor 70 for rejection there onto using the rams 72.

After all of the trays have been discharged from the housing 10, the latter, now in its lowered most position is moved on by a conveyor designated 74 which is located on either side of the actuating mechanism 62 of the scissors mechanism 60 and simply engages the underside edges of the housing 10.

In accordance with one of the preferred features of the invention, a roof or lid 76 extends over the transfer conveyor 70 all the way between the take off point generally designated 78 and the beginning of the exposed region where the operatives stand to unload the livestock from the open trays.

Referring once again to FIG. 1, the operatives conveniently stand on a walk way generally designated 80 so that they are at the correct height for unloading the livestock from the exposed trays.

Referring once again to the de-stacking apparatus shown in FIG. 2, it will be seen that by removing the lower most trays first, the trays above will always be fully covered either by the top most panel 82 of the housing 10 or by means of at least the floor of the tray immediately above and in the case of the already unloaded trays, by means of the roof or lid 76 over the transfer conveyor.

The advantage of the ivention is the large containers 10 do not need to be brought particularly close to the overhead conveyor and related parts of the slaughter house and the conveyor system between the de-stacking stage and the exposed section of the conveyor where the roof section 38 terminates can be of any size and direction so as to allow the unloading and loading bays and the exposed positions at which the livestock are to be removed from the trays can be as widely separated as is required within a factory or other installation.

We claim:

1. A system for handling livestock comprising:
    (a) a housing having separate compartments in the form of slideable open topped drawers which can be slide at least from one side thereof completely from the housing, the housing and drawers forming a container,
    (b) the housing includes a framework which provides guides on which the drawers can slide,
    (c) the said housing having a top panel which provides a cover for the upper most drawer or drawers,
    (d) each of the individual drawers below the upper most drawer or drawers being closed off (when in its pushed-in position) from the drawer above by at least the floor of the latter, (e) a transfer conveyor for receiving drawers removed from a container, (f) means for locating a container adjacent the transfer conveyor so that as a drawer is slid out from the container the underside registers with the transfer conveyor, (g) a roof spaced from and above the transfer conveyor for closing off the open tops of the drawers as they are transferred therealong so as to remove the tendency for livestock to jump or fly out of the drawers, and (h) an unloading station towards which the transfer conveyor moves the drawers beneath the said roof.

2. A system as set forth in claim 1 further comprising:

(a) an elevating platform adjacent the transfer conveyor (b) means for adjusting the height of the platform so that the underside of each of the drawers in the container registers in turn with the transfer conveyor and (c) means for removing each drawer and inserting it between the roof and the transfer conveyor as it comes into register with the transfer conveyor.

3. A system as set forth in claim 2 wherein the container includes at least two columns of drawers with the drawers in the columns being arranged in rows and the said means for removing the drawers is adapted to act on more than one of the drawers in each row simultaneously.

4. A system as set forth in claim 3 wherein all of the drawers in each row are removed simultaneously onto the transfer conveyor.

5. A system as set forth in claim 1 wherein the means for removing a drawer acts on the rear of the drawer and pushes the drawer onto the transfer conveyor.

6. A system as set forth in claim 5 wherein the means for removing the drawers is manually operable.

7. A system as set forth in claim 5 wherein the means for removing the drawers is powered by means of a hydraulic or pneumatic or electrical or mechanical means.

8. A system as set forth in claim 1 wherein each drawer is formed from a plastics material.

9. A system as set forth in claim 1 in which the container housing is at least in part formed from a plastics material.

10. A method of handling livestock contained in open topped drawers comprising the steps of:

(a) inserting the open topped drawers into a housing (b) transporting the housing to a first unloading position (c) removing the drawers from the container and loading the drawers onto a conveyor having a roof thereover for closing off the open tops of the drawers, and (d) moving the drawers on a conveyor to a second unloading station where the roof no longer covers the open topped drawers so as to allow access to the livestock contained therein.

11. A method as set forth in claim 10 wherein two or more drawers are simultaneously moved onto the transfer conveyor.

12. A method as set forth in claim 10 wherein the container is indexed vertically so as to present drawers at different levels in the container in turn to the transfer conveyor.

13. A method as set forth in claim 10 which includes the steps of washing and cleansing at least the drawers beyond the second unloading station before they are re-inserted into a container.

14. A method as set forth in the preceding claim in which the container is also washed and cleansed before drawers are reinserted thereinto.

15. Apparatus for handling livestock contained within open topped drawers removable from a container comprising:

(a) a platform upon which the container can be stood (b) a transfer conveyor adjacent the platform onto which the drawers containing the livestock can be slid (c) a roof over the conveyor and spaced therefrom so that the open top of a drawer located on the conveyor is closed off by the roof (d) means for removing the drawers from the container onto the conveyor so that the roof just closes off the open tops of the drawers and (e) means for adjusting the height of the container so that drawers at different levels therewithin can be removed onto the conveyor by sliding.

* * * * *